United States Patent
Snyder

(10) Patent No.: US 10,553,037 B2
(45) Date of Patent: *Feb. 4, 2020

(54) PROVIDING ERROR CORRECTION FOR PARTICLES OF DESTRUCTIBLE OBJECTS

(71) Applicant: Kabam, Inc., San Francisco, CA (US)

(72) Inventor: Cody Snyder, Maple Ridge (CA)

(73) Assignee: Kabam, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/369,328

(22) Filed: Mar. 29, 2019

(65) Prior Publication Data

US 2019/0228592 A1 Jul. 25, 2019

Related U.S. Application Data

(63) Continuation of application No. 15/498,151, filed on Apr. 26, 2017, now Pat. No. 10,249,099.

(51) Int. Cl.
*G06T 19/00* (2011.01)
*G06T 19/20* (2011.01)
(Continued)

(52) U.S. Cl.
CPC .......... *G06T 19/20* (2013.01); *G06T 7/74* (2017.01); *G06T 15/04* (2013.01); *G06T 2207/10028* (2013.01); *G06T 2219/2004* (2013.01)

(58) Field of Classification Search
CPC ..... G06T 19/006; G06T 15/005; G06T 19/20; G06T 2207/10016; G06T 15/04;
(Continued)

(56) References Cited

U.S. PATENT DOCUMENTS 10,249,099 B1 * 4/2019 Snyder ............... G06T 19/20
2006/0149516 A1 7/2006 Bond
(Continued)

OTHER PUBLICATIONS

Galoppo, Nico, et al. "Fast simulation of deformable models in contact using dynamic deformation textures." Proceedings of the 2006 ACM SIGGRAPH/Eurographics symposium on Computer animation. Eurographics Association, 2006.

*Primary Examiner* — Sultana M Zalalee
(74) *Attorney, Agent, or Firm* — Esplin & Associates, PC

(57) ABSTRACT

A system and method for providing positional error correction for particles of destructible objects in a three-dimensional volume in a virtual space includes electronic storage to store center-of-mass information of a set of objects, using a high-precision floating point format. Prior to runtime and/or interactive manipulation of the set of objects, a texture map is generated that includes positional information in a floating point format having less precision than the high-precision floating point format. A simulation uses this texture map to determine simulated center-of-mass information of the set of objects. This simulated center-of-mass information is compared with the previously stored center-of-mass information to determine which objects have positional errors, and which offsets are needed to correct the positional errors. The stored center-of-mass information is adjusted by the determined offsets, such that subsequent use, during interactive runtime, has no or reduced positional errors and/or artifacts caused by positional errors.

20 Claims, 4 Drawing Sheets

(51) Int. Cl.
*G06T 15/04* (2011.01)
*G06T 7/73* (2017.01)

(58) Field of Classification Search
CPC ............ G06T 1/60; G06T 2207/10024; G06T 11/206; G06T 11/60; G06T 15/205; G06T 15/80; G06T 2200/24; G06T 2207/10028; G06T 2207/10152; G06T 2207/20076; G06T 2207/30241; G06T 2207/30252; G06T 2207/30261; G06T 3/60; G06T 7/11; G06T 7/20; G06T 7/246; G06T 7/70; G06T 11/001; G06T 13/40; G06T 15/00; G06T 15/06; G06T 15/20; G06T 15/503; G06T 17/00; G06T 17/10; G06T 1/0007; G06T 1/20; G06T 2200/04; G06T 2207/10012; G06T 2207/20044; G06T 2207/20084; G06T 2207/20104; G06T 2207/20208; G06T 2207/30221; G06T 2207/30232; G06T 2207/30256; G06T 2207/30268; G06T 2210/12; G06T 2210/36; G06T 2210/61; G06T 2215/16; G06T 2219/004; G06T 2219/024; G06T 2219/2021; G06T 3/0006; G06T 5/008; G06T 5/009; G06T 7/194; G06T 7/215; G06T 7/248; G06T 7/292; G06T 7/33; G06T 7/50; G06T 7/536; G06T 7/593; G06T 7/73; G06T 7/74; G06T 7/90
See application file for complete search history.

(56) References Cited

U.S. PATENT DOCUMENTS

| | | |
|---|---|---|
| 2008/0021679 A1 | 1/2008 | Bleiweiss |
| 2008/0117215 A1 | 5/2008 | Hery |
| 2008/0285827 A1 | 11/2008 | Meyer |
| 2009/0219287 A1 | 9/2009 | Wang |
| 2014/0155160 A1 | 6/2014 | Lai |

\* cited by examiner

PROVIDING ERROR CORRECTION FOR PARTICLES OF DESTRUCTIBLE OBJECTS

FIELD OF THE DISCLOSURE

This disclosure relates to presenting objects in a virtual space, and, in particular, to using simulated center-of-mass information, determined prior to runtime, to calculate and correct positional errors for destructible objects within the virtual space.

BACKGROUND

Interactive applications that allow users to manipulate virtual objects in a three-dimensional volume in a virtual space may operate on a variety of different computing platforms, including physical-resource-limited client computing platforms such as smartphones, tablets, gaming consoles and the like. In some cases, computing platforms include specialized hardware to implement these interactive applications, such as a graphics processing unit (GPU). In some cases, objects within the virtual space may be destructible. For example, a destructible object may include multiple parts and/or particles. In some cases, the different parts and/or particles of individual destructible objects may be slightly out of position, which may result in visible artefacts.

SUMMARY

One aspect of the disclosure relates to providing error correction for particles of destructible objects in a virtual space. In some implementations, a system configured to providing positional error correction during an interactive application on a client computing platform may include one or more servers, one or more processors, electronic storage, one or more networks, one or more client computing platforms, one or more external resources, and/or other components. As used herein, the term "processor" is used interchangeably with the term "physical processor." The one or more processors may be configured by instructions to execute and/or implement one or more computer program components. The computer program components may include one or more of a space component, an initialization component, a render component, an error calculation component, an error correction component, an interactivity component, and/or other components.

The space component may be configured to execute an instance of a virtual space. The space component may implement the instance of the virtual space to facilitate participation by users in the virtual space. The virtual space may include one or more of a two-dimensional space, a three-dimensional space, and/or other virtual space. The instance of the virtual space may include virtual space content determined based on individual virtual space content associated with individual objects and the arrangement(s) of the objects, and/or other information. The objects may include destructible objects. Individual destructible objects may include multiple parts and/or particles.

The space component may use the instance of the virtual space to facilitate presentation of one or more views of the virtual space to a user. The space component may use the instance of the virtual space to enable a user to interact with the virtual space. In some implementations, the execution of the instance of the virtual space may include the space component executing an instance of a game and/or other application within the virtual space.

The space component may be configured to receive user requests to initiate actions at positions within the virtual space. A user request to initiate an action in the virtual space may specify an action type associated with the requested action. The action type may be used to obtain a function, method, routine, formula, software component or components, and/or any other means that may be used to execute the requested action. Examples of an action type may include, but not limited to, moving, turning, defending, attacking, mining, logging, farming, managing, surveying, training, researching, constructing, recruiting and/or any other action types appropriate for the virtual space. A user request to initiate an action may also specify one or more virtual space objects and/or characters to be acted on, for example, specific buildings (e.g., farm, bank, barrack, mill, lumber yard, etc.), resources (e.g., iron, gold, oil, coal, etc.), troop, knights and so on.

The space component may be configured to execute user requested actions at virtual space locations in an instance of the virtual space. The virtual space locations may include, but not limited to, areas designated as a city, realm, kingdom, state, nation, culture or the like, tiles for improvements (e.g., resource tiles that may be mined, food tiles that may be farmed, land tile that may be used to construct buildings, etc.), topology (e.g., road, hill, ocean, desert, lake, swamp, etc.), and/or any other locations appropriate for the virtual space.

The space component may be configured to receive user requests to participate in activities in the virtual space and execute those activities. The user requested activities may include, but is not limited to, initiating virtual space transactions (e.g., buying or selling virtual items, ordering services provided by the virtual space, and/or any other virtual space transactions), partaking in a game, mission, quest, campaign, expedition, training, tutorial, research and/or so on in the virtual space, consulting a virtual space expert (e.g., asking virtual consultants questions about performing diplomacy in the virtual space), messaging other users (e.g., texting, text chatting, voice chatting, etc.), convening (e.g., conducting an alliance meeting, voting in an alliance meeting, etc.), and/or any other virtual space activities.

The system may be configured to generate, store, use, and/or process different types of information, including but not limited to color information, positional information, depth information, center-of-mass information, particle information, and/or other types of information. Some types of information are specific to objects, vertices, edges, pixels, texels, grid points, surfaces, polygons, tiles, and/or other elements and/or sets of elements which a GPU may use to perform operations. For example, positional information may reflect a position of an object within a multi-dimensional volume in a virtual space. Alternatively, and/or simultaneously, positional information may reflect a position of a vertex. In some implementations, positional information may be relative to another object and/or element. In some implementations, objects and/or other elements may further be defined by one or more of center of mass, mass, heading, velocity, and/or other characteristics. In some implementations, particle information may reflect one or more of position, orientation, center of mass, mass, heading, velocity, and/or other characteristics of one or more parts and/or particles. Examples of particles may include smoke, dust, sparks, exploded, destroyed, and/or otherwise destructed objects, fractured objects, and/or other sets of objects moving simultaneously, in particular small objects). In particular, a destructible object may, upon being destroyed, include multiple parts and/or particles. For example, different parts and/or particles originally being part of the same object may, upon destruction of that object, have different positions, orientations, centers of mass, mass, headings, velocities, and/or other characteristics.

Different types of information may be stored and/or otherwise recorded in different formats. For example, certain types of information may be stored using integers. In some implementations, positional information may be stored in one or more floating point formats. For example, positional information may be stored in a high-precision floating point format that uses 32 bits (or more) of information to encode a single floating point number. In some implementations, certain types of information may be stored in a floating point format having a lower precision than the 32-bit high-precision floating point format. For example, certain types of information may be stored in a floating point format that uses 20 bits, or 16 bits (or less) of information to encode a single floating point number. Other floating point formats are envisioned within the scope of this disclosure.

As used herein, terms such as higher and lower precision refer to a higher or lower number of bits used to encode a single floating point number. Higher precision floating point numbers have a higher resolution than lower-precision floating point numbers. For example, in some implementations, higher and lower precision floating point formats may refer to 32-bit and 20-bit floating point formats, respectively. In another implementation, higher and lower precision floating point formats may refer to 20-bit and 16-bit floating point formats, respectively. In some implementations, the same type of positional information, e.g., center-of-mass information of one or more objects, may be stored and/or otherwise recorded in different floating point formats, depending on whether the information is used offline or during runtime and/or during real-time user interaction. For example, during development, positional information of objects within the virtual space may use a high-precision floating point format. Such usage may be based on a simulation mesh. For example, during real-time user interaction (e.g., when a player is playing a video game), at least some of the positional information (e.g., certain center-of-mass information and/or certain texture maps based thereon) may use a lower-precision floating point format (compared to the high-precision floating point format) for some or all of the objects. Such usage may be based on a renderable mesh. By way of non-limiting example, texture mapping hardware in a graphics pipeline of a client computing platform may be configured to perform texture operations on information that uses a lower-precision floating point format, e.g., a 16-bit floating point format. Depending on the exact three-dimensional position (or center of mass) of an individual object, there may be a positional difference.

One or more types of information may be stored in an electronic file and/or electronic storage. One or more types of information may be stored in a set of information. For example, a combination of different types of information may be stored in an electronic file and/or set of information referred to as a texture map. In some implementations, texture maps may include positional information, color information to create a texture on a three-dimensional object, as well as other information, including but not limited to center-of-mass information. In some implementations, center-of-mass information reflects a three-dimensional position of a center of mass of one or more objects in a three-dimensional volume in a virtual space. For example, center-of-mass information for an individual object may reflect a three-dimensional position of a center of mass of the individual object in the three-dimensional volume in the virtual space. In some implementations, multiple elements (e.g., parts and/or particles) may share a single center of mass. This may enhance computational efficiency when these multiple elements are manipulated, moved, and/or otherwise operated upon.

The initialization component may be configured to store information in electronic storage and/or electronic files. For example, the initialization component may be configured to store center-of-mass information of a set of objects in a three-dimensional volume in a virtual space. The stored center-of-mass information may reflect, per individual object, a three-dimensional position of a center of mass of the individual object. In some implementations, the initialization component may be configured to store information in electronic storage that is embedded within a GPU. For example, the initialization component may be configured to store information to initialize and/or otherwise prepare a GPU for certain operations. For example, in some implementations, center-of-mass information of a set of objects may be stored by repurposing a u-v vertex stream. In some implementations, one or more operations performed by the initialization component may occur prior to runtime and/or prior to real-time user interaction. As used herein, this time and/or phase (prior to runtime and/or prior to real-time user interaction) may be referred to as offline or development time. Alternatively, and/or at a different time, certain operations performed by the initialization component may occur during runtime and/or during real-time user interaction.

The render component may be configured to generate texture maps based on positional information of one or more objects. In some implementations, the render component may be configured to generate one or more texture maps based on center-of-mass information of one or more objects. For example, the render component may be configured to generate one or more texture maps based on the stored center-of-mass information that is stored by the initialization component. The generated texture maps may include positional information stored in a floating point format, for example a 16-bit or 20-bit floating point format.

The render component may be configured to determine center-of-mass information of one or more objects. In some implementations, the render component may be configured to determine center-of-mass information based on one or more texture maps. For example, the render component may be configured to determine center-of-mass information based on the texture map previously generated by the render component. In some implementations, one or more operations performed by the render component may occur offline. In some implementations, center-of-mass information determined offline by the render component may be referred to as simulated center-of-mass information. In some implementations, determining center-of-mass information based on a texture map may be referred to as sampling.

Alternatively, and/or simultaneously, certain operations performed by the render component may occur during runtime and/or during real-time user interaction. In particular, the render component may sample a texture map interactively when performing operations on a client computing platform, e.g., as part of an application that facilitates real-time user interaction with one or more objects in the three-dimensional volume in the virtual space, such as, by way of non-limiting example, a game.

The error calculation component may be configured to determine positional differences between different objects and/or other elements. In some implementations, the error calculation component may be configured to determine positional differences between center-of-mass information of different objects and/or center-of-mass information determined and/or otherwise derived through different components. For example, the error calculation component may be configured to determine positional differences between the positions (and/or centers-of-mass) of one or more objects in the stored center-of-mass information (e.g., stored by the initialization component) and the simulated center-of-mass information (e.g., determined by the render component). For example, the error calculation component may be configured to determine a positional difference between the position (or center of mass) of an individual object in the stored center-of-mass information and the same object in the simulated center-of-mass information. In some cases, the error calculation component may operate on a set of objects in a virtual space that includes a subset of objects that have no positional difference (by virtue of their exact three-dimensional position) and a subset of objects that have a positional difference (by virtue of their exact three-dimensional position). In some implementations, one or more operations performed by the error calculation component may occur offline.

The error correction component may be configured to adjust and/or otherwise modify information, including stored information. For example, the error correction component may be configured to adjust center-of-mass information based on positional differences determined by the error calculation component. In some implementations, the error correction component may be configured to generate information based on positional differences determined by the error calculation component and/or other information. For example, a positional difference may be used to adjust positional information (e.g., a center of mass) of an object. In some implementations, a positional adjustment of the positional information of an object may be referred to as an offset.

The interactivity component may be configured to receive user input from users that interact with the virtual space, e.g. through an interactive application. In some implementations, the users may be associated with client computing platforms. For example, the users may enter and/or select user input through user interfaces of the client computing platforms. Operations performed by the interactivity component may occur during runtime and/or during real-time user interaction. For example, a user (or player) may perform an operation and/or activity that causes a destructible object within the virtual space to be destroyed. Different parts and/or particles of the destructible object may be propelled in different directions. For example, the interactivity component may be configured to facilitate interactive gameplay by the users (e.g., in conjunction with other components described in this disclosure).

As used herein, any association (or relation, or reflection, or indication, or definition, or correspondency) involving objects, positions, parts, particles, center-of-mass information, texture maps, positional differences, positional adjustments, pixels, vertices, parameters, thresholds, functions, vectors, and/or another entity or object that interacts with any part of the system and/or plays a part in the operation of the system, may be a one-to-one association, a one-to-many association, a many-to-one association, and/or a many-to-many association or N-to-M association (note that N and M may be different numbers greater than 1).

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
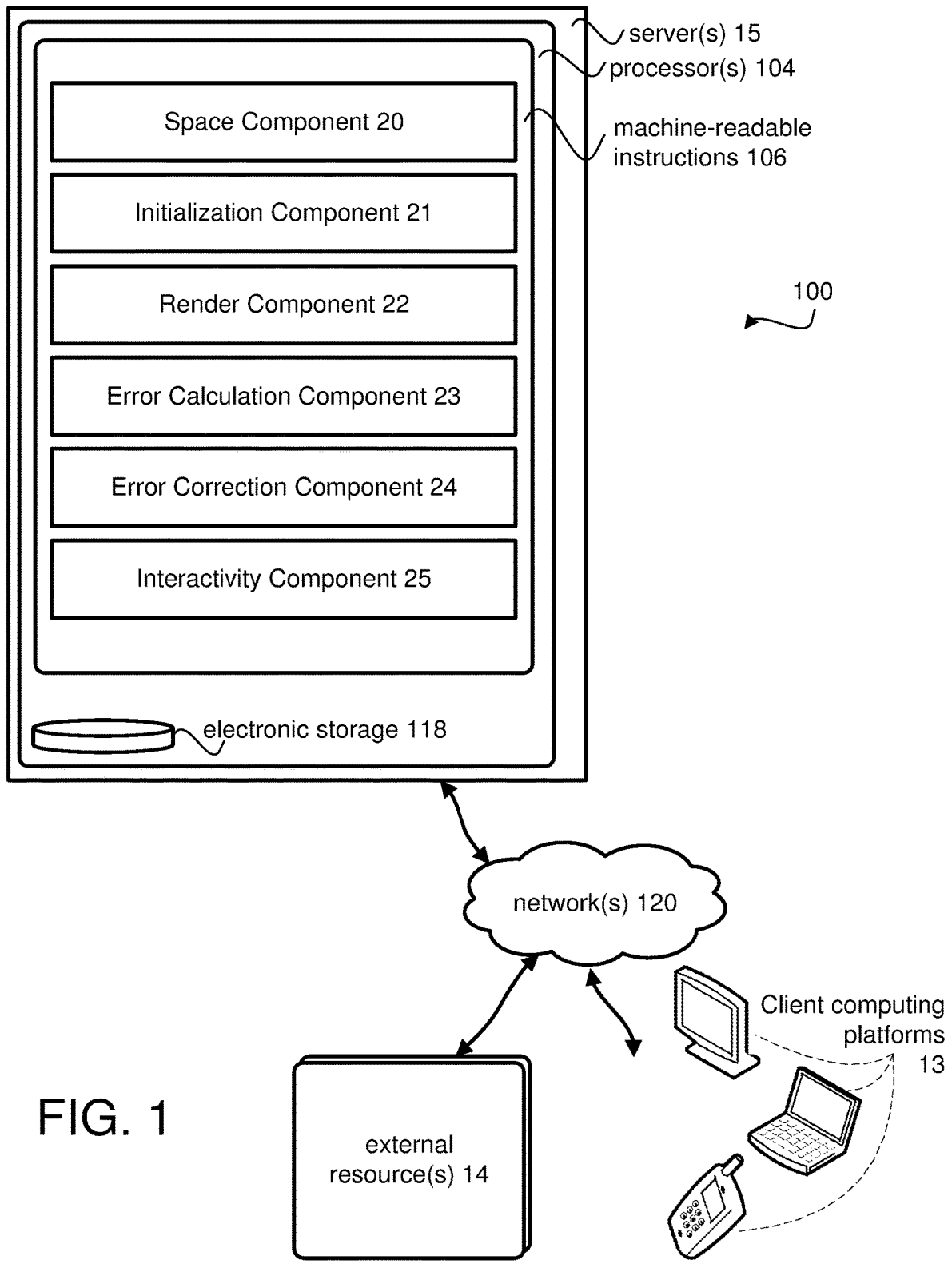
FIG. 1 illustrates an exemplary system configured to provide positional error correction for particles of destructible objects, in accordance with one or more implementations.

FIG. 1 illustrates a system 100 configured to provide error correction for particles of destructible objects in a virtual space. System 100 may be configured to provide positional error correction for particles of destructible objects during an interactive application (such as a game) on one or more client computing platforms 13. System 100 may include one or more servers 15, one or more processors 104, electronic storage 118, one or more networks 120, one or more other client computing platforms 13, one or more external resources 14, and/or other components. Users may access system 100 and/or the virtual space via client computing platform 13. In some implementations, individual ones of client computing platforms 13 may correspond to individual ones of the users.

Server 15 and/or processors 104 may be configured to execute one or more computer program components. The computer program components may include one or more of a space component 20, an initialization component 21, a render component 22, an error calculation component 23, an error correction component 24, an interactivity component 25, and/or other components. In some implementations, the functionality attributed to one or more components may be performed by different computing platforms, e.g. remote from other components. For example, some functionality may be performed by server 15, while other functionality may be performed by client computing platform 13.

System 100 may be configured to manage one or more user accounts, user profiles, and/or user information associated with users of the system 100. The one or more user accounts, user profiles, and/or user information may include information stored by system 100, one or more of client computing platforms 13, and/or other storage locations. In some implementations, the users may be distinguished in different types. For example, a first type of user may be a player and/or an interactive user that uses system 100 to interact with objects within the virtual space. For example, a second type of user may be a developer and/or a developing user that uses system 100 to develop or improve the application for players. For example, developers may use system 100 mostly offline, whereas players may use system 100 mostly in real-time. Certain components of system 100 may be used by different types of users, even though the operations performed by such a component may be specific to the time of use. In other words, the same component may have a first functionality during development time and a second (related but different) functionality during runtime and/or during real-time user interaction.

Space component 20 may be configured to execute an instance of a virtual space. Space component 20 may implement the instance of the virtual space to facilitate participation by users in the virtual space. The instance of the virtual space may include virtual space content determined based on individual virtual space content associated with individual objects and the arrangement(s) of the objects, and/or other information. As used herein, the term objects may include static, moveable, and moving objects and characters. Space component 20 may use the instance of the virtual space to facilitate presentation of one or more views of the virtual space to a user. Space component 20 may use the instance of the virtual space to enable a user to interact with the virtual space. In some implementations, the execution of the instance of the virtual space may include space component 20 executing an instance of a game within the virtual space.

Figure 3A:
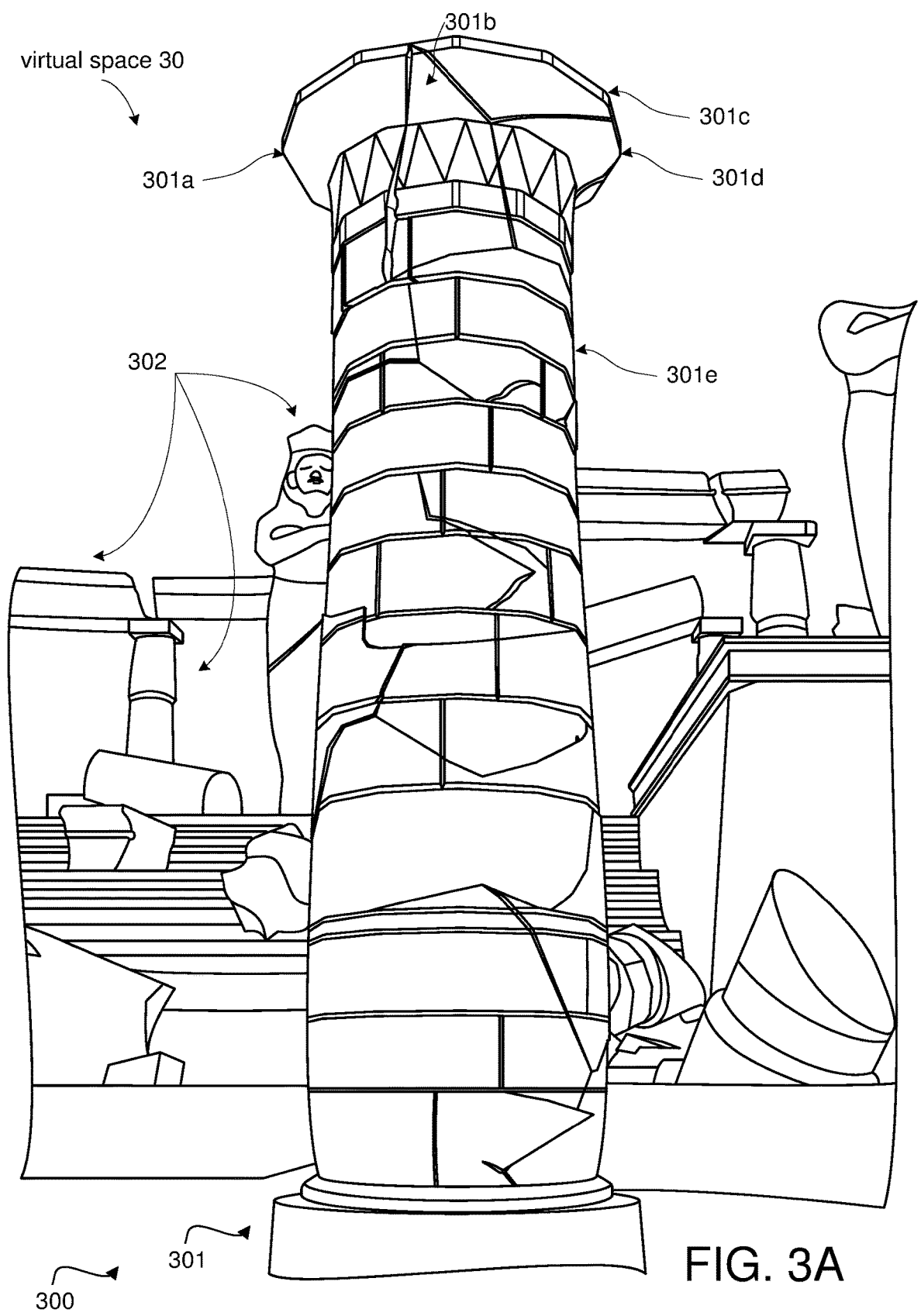
FIGS. 3A-3B illustrate depictions of virtual spaces and/or objects within virtual spaces that may be used by a system configured to provide positional error correction for particles of destructible objects, in accordance with one or more implementations.

By way of non-limiting example, FIG. 3A illustrates a depiction 300 of a virtual space 30 that may be used by a system configured to provide positional error correction for particles of destructible objects. For example, virtual space 30 may be used for an interactive application, such as a game. Virtual space 30 may include a destructible object 301, several structural elements 302, and/or other objects. For example, as depicted, destructible object 301 may be a pillar. Destructible object 301 may include multiple different parts, including but not limited to a part 301a, a part 301b, a part 301c, a part 301d, and a part 301e. In some implementations, the individual parts of destructible object 301 may have individual centers of mass.

Referring to FIG. 1, space component 20 may be configured to receive user requests to initiate actions at locations within the virtual space. A user request to initiate an action in the virtual space may specify an action type associated with the requested action. A user request to initiate an action may also specify one or more virtual space objects and/or characters to be acted on. Space component 20 may be configured to execute user requested actions at virtual space locations in an instance of the virtual space.

The disclosure of the virtual space determined from the instance executed by space component 20 is not intended to be limiting. The virtual space may be presented in a more limited or richer manner. For example, views of the virtual space may be selected from a limited set of graphics depicting an event in a given place within the virtual space. The views may include additional content (e.g., text, audio, pre-stored video content, animation content, and/or other content) that describes particulars of the current state of the place, beyond the relatively generic graphics. For example, a view may include a generic battle graphic with a textual description of the opponents to be confronted. Other representations of individual places within the virtual space are contemplated.

Within the instance of the virtual space executed by space component 20, users may control characters, objects, simulated physical phenomena (e.g., wind, rain, earthquakes, and/or other phenomena), and/or other elements within the virtual space to interact with the virtual space and/or each other. The user characters may include avatars. As used herein, the term "user character" may refer to an object (or group of objects) present in the virtual space that represents an individual user. The user character may be controlled by the user with which it is associated. The user controlled element(s) may move through and interact with the virtual space (e.g., non-user characters in the virtual space, other objects in the virtual space). The user controlled elements controlled by and/or associated with a given user may be created and/or customized by the given user. The user may have an "inventory" of virtual goods and/or currency that the user can use (e.g., by manipulation of a user character or other user controlled element, and/or other items) within the virtual space.

The users may participate in the instance of the virtual space by controlling one or more of the available user controlled elements in the virtual space. Control may be exercised through control inputs and/or commands provided by the users through client computing platforms 13. The control inputs and/or commands provided by a user may specify an action involving controlled elements at a virtual space location. Such a user-initiated action in the virtual space may change the state of the virtual space at an instance when the action is executed in the virtual space. Such a user-initiated action in the virtual space may change views of the virtual space when the action is executed in the virtual space.

The users may interact with each other through communications exchanged within the virtual space. Such communications may include one or more of textual chat, instant messages, private messages, voice communications, and/or other communications. Communications may be received and entered by the users via their respective client computing platforms 13. Communications may be routed to and from the appropriate users.

System 100 may be configured to generate, store, use, and/or process different types of information, including but not limited to color information, positional information, depth information, center-of-mass information, particle information, and/or other types of information. Some types of information are specific to objects, vertices, edges, pixels, texels, grid points, surfaces, polygons, tiles, and/or other elements and/or sets of elements which a GPU may use to perform operations. For example, positional information may reflect a position of an object within a multi-dimensional volume in a virtual space. Alternatively, and/or simultaneously, positional information may reflect a position of a vertex. In some implementations, positional information may be relative to another object and/or element. In some implementations, objects and/or other elements may further be defined by one or more of center of mass, mass, heading, velocity, and/or other characteristics. In some implementations, particle information may reflect one or more of position, orientation, center of mass, mass, heading, velocity, and/or other characteristics of one or more parts and/or particles.

A destructible object may, upon being destructed, include multiple parts and/or particles. For example, different parts and/or particles originally being part of the same object may, upon destruction of that object, have one or more different positions, orientations, centers of mass, mass, headings, velocities, and/or other characteristics. In some implementations, the individual parts of a particular destructible object may have individual centers of mass.

Different types of information may be stored and/or otherwise recorded in different formats. For example, certain types of information may be stored using integers. In some implementations, positional information may be stored in one or more floating point formats.

In some implementations, the same type of positional information, e.g., center-of-mass information of one or more objects, may be stored and/or otherwise recorded in different floating point formats, depending on whether the information is used offline or during runtime and/or during real-time user interaction. For example, during development, positional information of objects within the virtual space may use a high-precision floating point format. For example, during real-time user interaction (e.g., when a player is playing a video game), at least some of the positional information (e.g., certain center-of-mass information and/or certain texture maps based thereon) may use a lower-precision floating point format (compared to the high-precision floating point format) for some or all of the objects. By way of non-limiting example, texture mapping hardware in a graphics pipeline of client computing platform 13 may be configured to perform texture operations on information that uses a lower-precision floating point format, e.g., a 16-bit floating point format. Depending on the exact three-dimensional position (or center of mass) of an individual object, there may be a positional difference.

In some implementations, center-of-mass information may reflect a three-dimensional position of a center of mass of one or more objects in a three-dimensional volume in a virtual space. For example, center-of-mass information for an individual object may reflect a three-dimensional position of a center of mass of the individual object in the three-dimensional volume in the virtual space. In some implementations, multiple elements (e.g., parts and/or particles) may share a single center of mass. This may enhance computational efficiency when these multiple elements are manipulated, moved, and/or otherwise operated upon.

By way of non-limiting example, destructible object 301 depicted in FIG. 3A includes part 301a, part 301b, part 301c, part 301d, part 301e, and/or other parts as they are presented during real-time user interaction with virtual space 30. Due to positional differences as described herein, one or more parts of destructible object 301 may be positioned improperly, i.e., not in such a manner that the individual parts appear seamless or as they appear during development. Instead, due to the positional differences, gaps or cracks may be visible between some parts of destructible object 301. For example, gaps or cracks appear visible between part 301 and part 301b, between part 301c and part 301d, and so forth. For example, in some implementations, these cracks or gaps may be big enough so that light emitted by a light source positioned behind destructible object 301 is able to penetrate destructible object 301 and reach the player's view point.

Referring to FIG. 1, in some implementations, positional information may be stored and/or formatted in such a way that operations in a graphics pipeline (including but not limited to texture operations) may be used to operation on the information, e.g. to determine characteristics of one or more objects and/or elements. For example, the graphics pipeline may perform a texture operation to perform, e.g., a different operation. By virtue of the formatting of information in a particular manner, the resulting output generated by the graphics pipeline may be interpreted as updated characteristics of the particular objects and/or elements. As used herein, such updated information may correspond to a subsequent moment in time, e.g. a subsequent frame.

Initialization component 21 may be configured to store information in electronic storage and/or electronic files. For example, initialization component 21 may be configured to store center-of-mass information of a set of objects in a three-dimensional volume in a virtual space. The stored center-of-mass information may reflect, per individual object, a three-dimensional position of a center of mass of the individual object. In some implementations, initialization component 21 may be configured to store information in electronic storage that is embedded within a GPU. For example, initialization component 21 may be configured to store information to initialize and/or otherwise prepare a GPU for certain operations. For example, in some implementations, center-of-mass information of a set of objects may be stored by repurposing a u-v vertex stream. In some implementations, one or more operations performed by initialization component 21 may occur offline. Alternatively, and/or at a different time, certain operations performed by initialization component 21 may occur during runtime and/or during real-time user interaction.

Render component 22 may be configured to generate texture maps based on positional information of one or more objects. In some implementations, render component 22 may be configured to generate one or more texture maps based on center-of-mass information of one or more objects. For example, render component 22 may be configured to generate one or more texture maps based on the stored center-of-mass information that is stored by initialization component 21. The generated texture maps may include positional information stored in a floating point format, for example a 16-bit or 20-bit floating point format.

Render component 22 may be configured to determine center-of-mass information of one or more objects. In some implementations, render component 22 may be configured to determine center-of-mass information based on one or more texture maps. For example, render component 22 may be configured to determine center-of-mass information based on the texture map previously generated by render component 22. In some implementations, one or more operations performed by render component 22 may occur offline. In some implementations, center-of-mass information determined offline by render component 22 may be referred to as simulated center-of-mass information. In some implementations, determining center-of-mass information based on a texture map may be referred to as sampling.

Alternatively, and/or simultaneously, certain operations performed by render component 22 may occur during runtime and/or during real-time user interaction. In particular, render component 22 may sample a texture map interactively when performing operations on a client computing platform, e.g., as part of an application that facilitates real-time user interaction with one or more objects in the three-dimensional volume in the virtual space, such as, by way of non-limiting example, a game.

Error calculation component 23 may be configured to determine positional differences between different objects, parts of objects, and/or other elements. In some implementations, error calculation component 23 may be configured to determine positional differences between center-of-mass information of different objects and/or center-of-mass information determined and/or otherwise derived through different components. For example, error calculation component 23 may be configured to determine positional differences between the positions (and/or centers-of-mass) of one or more objects in the stored center-of-mass information (e.g., stored by initialization component 21) and the simulated center-of-mass information (e.g., determined by render component 22). For example, error calculation component 23 may be configured to determine a positional difference between the position (or center of mass) of an individual object in the stored center-of-mass information and the same object in the simulated center-of-mass information. In some cases, error calculation component 23 may operate on a set of objects in a virtual space that includes a subset of objects that have no positional difference (by virtue of their exact three-dimensional position) and a subset of objects that have a positional difference (by virtue of their exact three-dimensional position). In some implementations, one or more operations performed by error calculation component 23 may occur offline.

By way of non-limiting example, destructible object 301 depicted in FIG. 3A includes part 301a, part 301b, part 301c, part 301d, part 301e, and/or other parts as they are presented during real-time user interaction with virtual space 30. The center of mass of one or more parts of destructible object 301 may have positional differences. For example, part 301d may have a positional difference of a particular distance to the right (in this depiction merely a few pixels). The center of mass of other parts of destructible object 301 may have no positional differences. For example, part 301e may have no positional difference at all.

Referring to FIG. 1, error correction component 24 may be configured to adjust and/or otherwise modify information, including stored information. For example, error correction component 24 may be configured to adjust center-of-mass information based on positional differences determined by error calculation component 23. In some implementations, error correction component 24 may be configured to generate information based on positional differences determined by error calculation component 23 and/or other information. For example, a positional difference may be used to adjust positional information (e.g., a center of mass) of an object. In some implementations, a positional adjustment of the positional information of an object may be referred to as an offset.

Figure 3B:
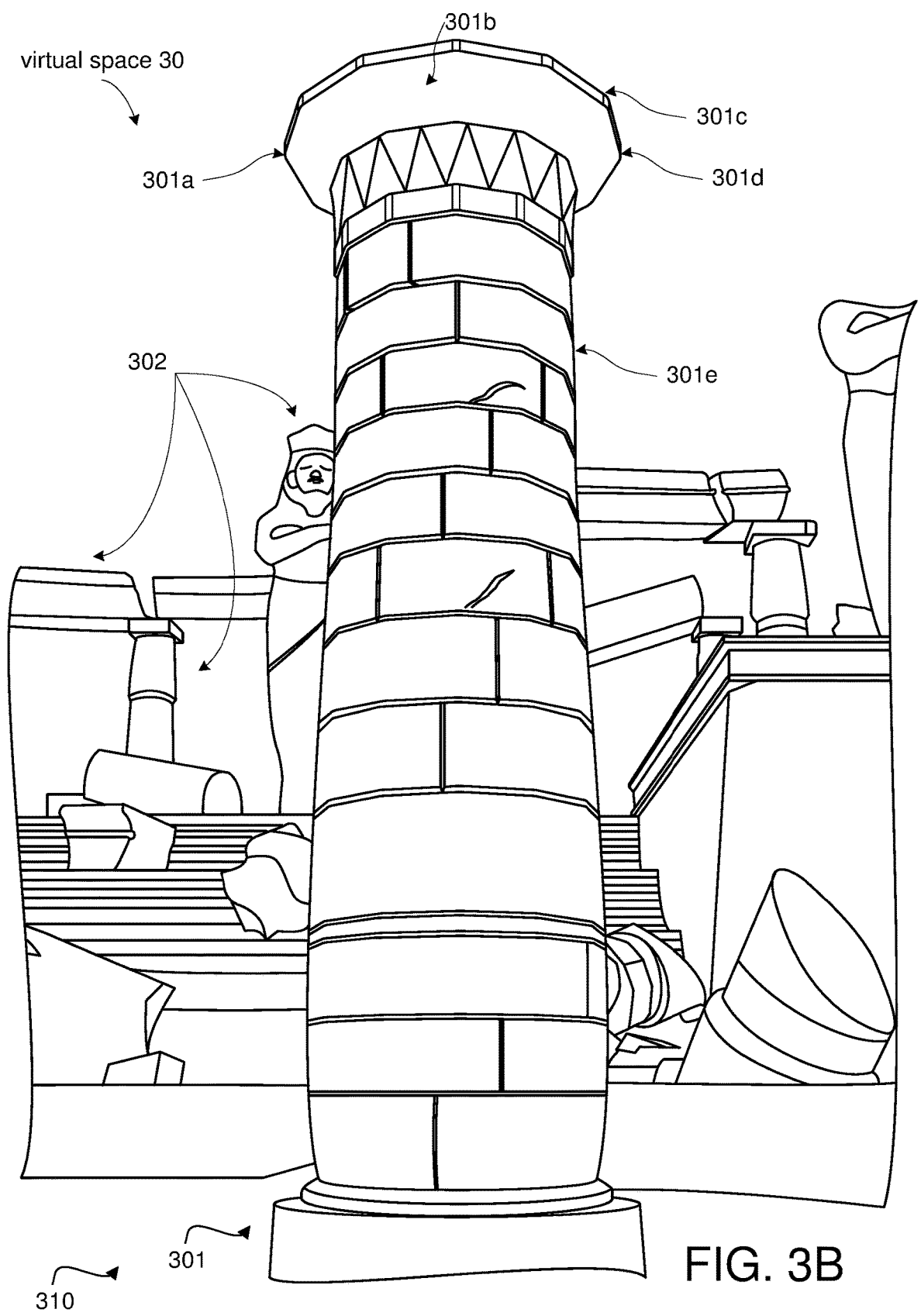

By way of non-limiting example, destructible object 301 depicted in FIG. 3A includes part 301a, part 301b, part 301c, part 301d, part 301e, and/or other parts as they are presented during real-time user interaction with virtual space 30. A positional difference for part 301d of a particular distance to the right (in this depiction merely a few pixels) may be reduced and/or corrected by a positional adjustment, e.g., a positional adjustment of the same particular distance in the opposite direction (here, to the left). Once the various positional differences have been offset as described herein, some or all of the visible gaps or cracks may be reduced or removed and/or otherwise no longer visible to a user. By way of non-limiting example, FIG. 3B illustrates a depiction 310 of the virtual space 30 that may be used by a system configured to provide positional error correction for particles of destructible objects. Virtual space 30 may include destructible object 301, several structural elements 302, and/or other objects. Destructible object 301 may include multiple different parts, including but not limited to part 301a, part 301b, part 301c, part 301d, and part 301e. The different parts of destructible object 301 may appear seamless, such that no gaps or cracks appear visible between part 301 and part 301b, between part 301c and part 301d, and so forth.

Interactivity component 25 may be configured to receive user input from users that interact with the virtual space, e.g. through an interactive application. In some implementations, the users may be associated with client computing platforms. For example, the users may enter and/or select user input through user interfaces of the client computing platforms. Operations performed by interactivity component 25 may occur during runtime and/or during real-time user interaction. For example, a user (or player) may perform an operation and/or activity that causes a destructible object within the virtual space to be destroyed. Different parts and/or particles of the destructible object may be propelled in different directions. For example, interactivity component 25 may be configured to facilitate interactive gameplay by the users (e.g., in conjunction with other components described in this disclosure).

Referring to FIG. 1, in some implementations, system 100 may be configured to store information in electronic storage 118. In some implementations, system 100 may be configured to store information in one or more electronic files. In some implementations, system 100 may be configured to retrieve information, e.g., from electronic storage 118. In some implementations, system 100 may be configured to transfer information between different components of system 100.

Referring to FIG. 1, server 15, client computing platforms 13, and/or external resources 14 may be operatively linked via one or more electronic communication links. For example, such electronic communication links may be established, at least in part, via a network 120 such as the Internet and/or other networks. It will be appreciated that this is not intended to be limiting, and that the scope of this disclosure includes implementations in which server 15, client computing platforms 13, and/or external resources 14 may be operatively linked via some other communication media.

Client computing platforms 13 may include one or more processors configured to execute computer program components. The computer program components may be configured to enable a user associated with the client computing platform to interface with system 100 and/or external resources 14, and/or provide other functionality attributed herein to server 15 and/or other client computing platforms 13. By way of non-limiting example, client computing platforms may include one or more of a desktop computer, a laptop computer, a handheld computer, a tablet computing platform, a NetBook, a Smartphone, a gaming console, and/or other computing platforms.

External resources 14 may include sources of information, hosts and/or providers of virtual environments outside of system 100, external entities participating with system 100, and/or other resources. In some implementations, some or all of the functionality attributed herein to external resources 14 may be provided by resources included in system 100.

System 100 may include electronic storage 118, one or more processors 104, and/or other components. System 100 may include communication lines, or ports to enable the exchange of information with network 120 and/or other computing platforms. Illustration of server 15 in FIG. 1 is not intended to be limiting. Server 15 may include a plurality of hardware, software, and/or firmware components operating together to provide the functionality attributed herein to server 15. For example, server 15 may be implemented by a cloud of computing platforms operating together.

Electronic storage 118 may comprise non-transitory storage media that electronically stores information. The electronic storage media of electronic storage 118 may include one or both of system storage that is provided integrally (i.e., substantially non-removable) with server 15 and/or removable storage that is removably connectable to server 15 via, for example, a port (e.g., a USB port, a firewire port, etc.) or a drive (e.g., a disk drive, etc.). Electronic storage 118 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 118 may include one or more virtual storage resources (e.g., cloud storage, a virtual private network, and/or other virtual storage resources). Electronic storage 118 may store software algorithms, information determined by processor 104, information received from server 15, information received from client computing platforms 13, and/or other information that enables server 15 to function as described herein.

Processor(s) 104 is configured to provide information processing capabilities in system 100. As such, processor 104 may include one or more of a digital processor, an analog processor, a digital circuit designed to process information, an analog circuit designed to process information, a state machine, and/or other mechanisms for electronically processing information. Although processor 104 is shown in FIG. 1 as a single entity, this is for illustrative purposes only. In some implementations, processor 104 may include a plurality of processing units. These processing units may be physically located within the same device, or processor 104 may represent processing functionality of a plurality of devices operating in coordination. The processor 104 may be configured to execute components 20-25 and/or other components. Processor 104 may be configured to execute components 20-25 and/or other components by software; hardware; firmware; some combination of software, hardware, and/or firmware; and/or other mechanisms for configuring processing capabilities on processor 104. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 20-25 are illustrated in FIG. 1 as being implemented within a single processing unit, in implementations in which processor 104 includes multiple processing units, one or more of components 20-25 may be implemented remotely from the other components. The description of the functionality provided by the different components 20-25 described below is for illustrative purposes, and is not intended to be limiting, as any of components 20-25 may provide more or less functionality than is described. For example, one or more of components 20-25 may be eliminated, and some or all of its functionality may be provided by other ones of components 20-25. As another example, processor 104 may be configured to execute one or more additional components that may perform some or all of the functionality attributed below to one of components 20-25.

Figure 2:
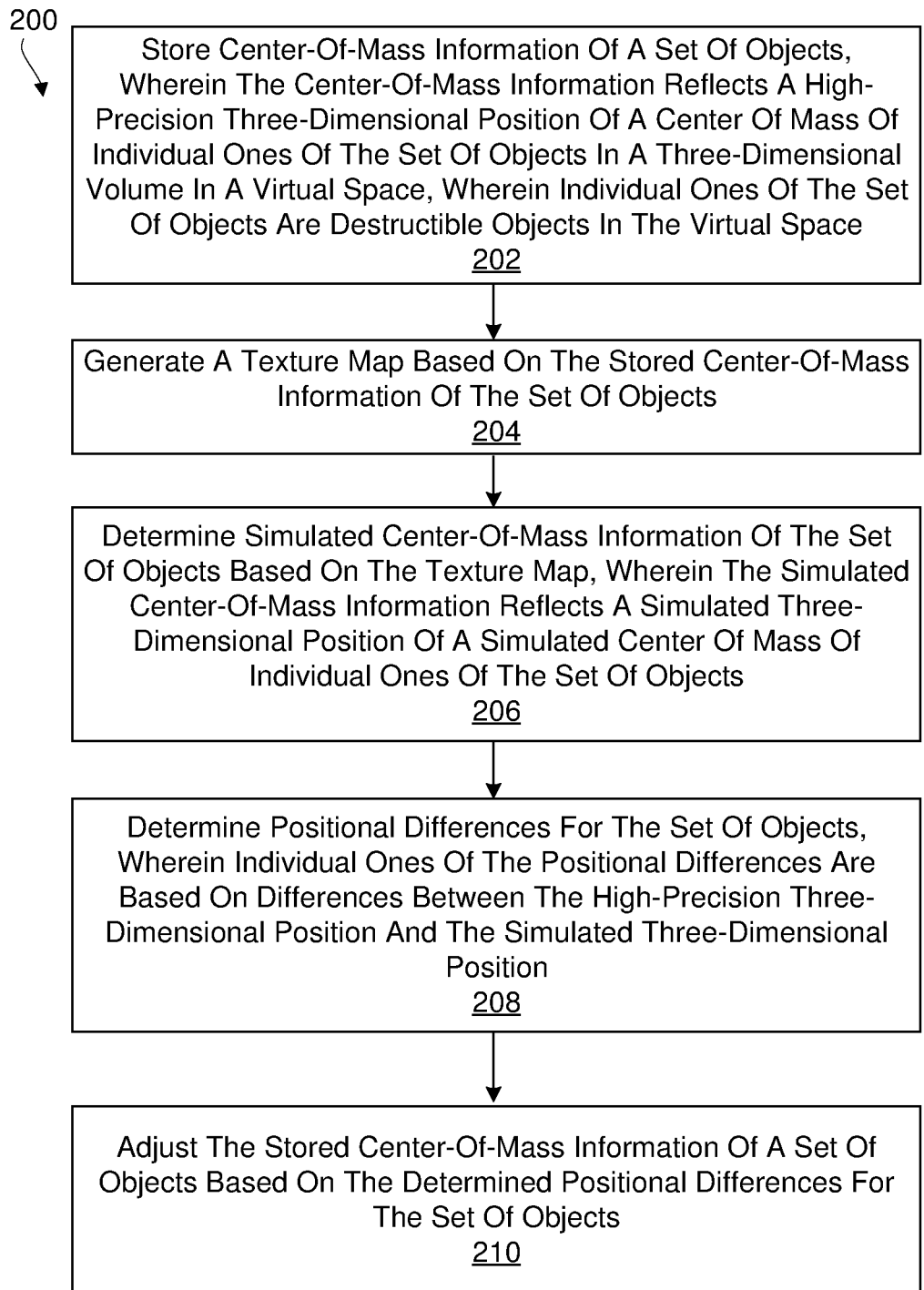
FIG. 2 illustrates an exemplary method of providing positional error correction for particles of destructible objects, in accordance with one or more implementations.

FIG. 2 illustrates one exemplary method to provide error correction for particles of destructible objects on a client computing platform. The operations of method 200 presented below are intended to be illustrative. In some embodiments, method 200 may be accomplished with one or more additional operations not described, and/or without one or more of the operations discussed. Additionally, the order in which the operations of method 200 are illustrated in FIG. 2 and described below is not intended to be limiting.

In some embodiments, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

At an operation 202, center-of-mass information of a set of objects is stored. The center-of-mass information reflects a high-precision three-dimensional position of a center of mass of individual ones of the set of objects in a three-dimensional volume in a virtual space. The high-precision three-dimensional position is stored in a first floating point format. Individual ones of the set of objects are destructible objects in the virtual space. In some embodiments, operation 202 is performed, at least in part, by an initialization component the same as or similar to initialization component 21 (shown in FIG. 1 and described herein).

At an operation 204, a texture map is generated based on the stored center-of-mass information of the set of objects. Positional information included in the texture map is stored in a second floating point format. In some embodiments, operation 204 is performed by a render component the same as or similar to render component 22 (shown in FIG. 1 and described herein).

At an operation 206, simulated center-of-mass information of the set of objects is determined based on the texture map. The simulated center-of-mass information reflects a simulated three-dimensional position of a simulated center of mass of individual ones of the set of objects in the three-dimensional volume in the virtual space. In some embodiments, operation 206 is performed by a render component the same as or similar to render component 22 (shown in FIG. 1 and described herein).

At an operation 208, positional differences for the set of objects are determined. Individual ones of the positional differences are based on differences between the high-precision three-dimensional position and the simulated three-dimensional position. In some embodiments, operation 208 is performed by an error calculation component the same as or similar to error calculation component 23 (shown in FIG. 1 and described herein).

At an operation 210, the stored center-of-mass information of a set of objects is adjusted based on the determined positional differences for the set of objects. In some embodiments, operation 210 is performed by an error correction component the same as or similar to error correction component 24 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to provide error corrections for positions of objects in a three-dimensional volume in a virtual space so that visible gaps in the objects are removed or reduced, the system comprising:
one or more processors configured by machine-readable instructions to:
store center-of-mass information of a set of objects, wherein the center-of-mass information reflects a three-dimensional position of a center of mass of individual ones of the set of objects in the three-dimensional volume in the virtual space, wherein the three-dimensional position is stored in a first floating-point format, wherein the individual ones of the set of objects are objects in the virtual space, and wherein the first floating-point format encodes floating-point numbers using a first number of bits;
generate a texture map based on the stored center-of-mass information of the set of objects, wherein the texture map includes positional information for the set of objects, wherein the positional information included in the texture map has a second floating-point format, wherein the second floating-point format encodes floating-point numbers using a second number of bits, and wherein the first number of bits is greater than the second number of bits;
determine simulated center-of-mass information of the set of objects based on the texture map, wherein the simulated center-of-mass information reflects a simulated three-dimensional position of a simulated center of mass of individual ones of the set of objects in the three-dimensional volume in the virtual space;
determine positional differences for the set of objects, wherein individual ones of the determined positional differences are based on comparisons between the stored three-dimensional position in the first floating-point format and the simulated three-dimensional position using the second floating-point format; and
adjust the stored center-of-mass information of at least some objects in the set of objects based on the determined positional differences.

2. The system of claim 1, wherein the one or more processors are further configured to determine, during runtime, a runtime three-dimensional position of the set of objects in the three-dimensional volume in the virtual space, wherein the determination is based on using the adjusted stored center-of-mass information.

3. The system of claim 2, wherein the one or more processors are configured to determine the runtime three-dimensional position of the set of objects by:
generating a runtime texture map based on the adjusted stored center-of-mass information of the set of objects, wherein positional information included in the runtime texture map uses the second floating-point format; and
determining the runtime three-dimensional position of the set of objects based on the runtime texture map.

4. The system of claim 3, wherein the runtime texture map is used to store positional information of individual ones of the set of objects in the three-dimensional volume in the virtual space.

5. The system of claim 1, wherein the first floating-point format uses 32 bits of information to encode a single floating-point number.

6. The system of claim 1, wherein the second floating-point format uses 16 bits of information to encode a single floating-point number.

7. The system of claim 1, wherein the one or more processors are configured to perform generation of the texture map, determination of the simulated center-of-mass information, determination of the positional differences, and adjustment of the stored center-of-mass information prior to runtime of an application that facilitates real-time user interaction with individual ones of the set of objects in the three-dimensional volume in the virtual space.

8. The system of claim 2, wherein the one or more processors are configured to perform determination of the runtime three-dimensional position of the set of objects interactively in real-time based on user input.

9. The system of claim 3, wherein the system includes a client computing platform that includes at least one of the one or more processors, and wherein determination of the runtime three-dimensional position of the set of objects is performed interactively by a component of the client computing platform that is configured to perform texture operations.

10. The system of claim 1, wherein the one or more processors are further configured to:
store the center-of-mass information by repurposing a u-v vertex stream; and
generate the texture map by rendering the stored center-of-mass information in the texture map.

11. A computer-implemented method to provide error corrections for positions of objects in a three-dimensional volume in a virtual space so that visible gaps in the objects are removed or reduced, the method being implemented in one or more processors configured by machine-readable instructions, the method comprising:
storing center-of-mass information of a set of objects, wherein the center-of-mass information reflects a three-dimensional position of a center of mass of individual ones of the set of objects in the three-dimensional volume in the virtual space, wherein the three-dimensional position is stored in a first floating-point format, wherein the individual ones of the set of objects are objects in the virtual space, and wherein the first floating-point format encodes floating-point numbers using a first number of bits;
generating a texture map based on the stored center-of-mass information of the set of objects, wherein the texture map includes positional information for the set of objects, wherein the positional information included in the texture map has a second floating-point format, wherein the second floating-point format encodes floating-point numbers using a second number of bits, and wherein the first number of bits is greater than the second number of bits;
determining simulated center-of-mass information of the set of objects based on the texture map, wherein the simulated center-of-mass information reflects a simulated three-dimensional position of a simulated center of mass of individual ones of the set of objects in the three-dimensional volume in the virtual space;
determining positional differences for the set of objects, wherein individual ones of the determined positional differences are based on comparisons between the stored three-dimensional position in the first floating-point format and the simulated three-dimensional position using the second floating-point format; and adjusting the stored center-of-mass information of at least some objects in the set of objects based on the determined positional differences.

12. The method of claim 11, further comprising:
determining, during runtime, a runtime three-dimensional position of the set of objects in the three-dimensional volume in the virtual space, wherein the determination is based on using the adjusted stored center-of-mass information.

13. The method of claim 12, wherein determining the runtime three-dimensional position of the set of objects includes:
generating a runtime texture map based on the adjusted stored center-of-mass information of the set of objects, wherein positional information included in the runtime texture map uses the second floating-point format; and
determining the runtime three-dimensional position of the set of objects based on the runtime texture map.

14. The method of claim 13, wherein the runtime texture map is used to store positional information of individual ones of the set of objects in the three-dimensional volume in the virtual space.

15. The method of claim 11, wherein the first floating-point format uses 32 bits of information to encode a single floating-point number.

16. The method of claim 11, wherein the second floating-point format uses 16 bits of information to encode a single floating-point number.

17. The method of claim 11, further comprising:
performing generation of the texture map, determination of the simulated center-of-mass information, determination of the positional differences, and adjustment of the stored center-of-mass information prior to runtime of an application that facilitates real-time user interaction with individual ones of the set of objects in the three-dimensional volume in the virtual space.

18. The method of claim 12, wherein determining the runtime three-dimensional position of the set of objects is performed interactively in real-time based on user input.

19. The method of claim 13, wherein determining the runtime three-dimensional position of the set of objects is performed interactively by a component of the client computing platform that performs texture operations.

20. The method of claim 11, further comprising:
storing the center-of-mass information by repurposing a u-v vertex stream; and
generating the texture map by rendering the stored center-of-mass information in the texture map.

* * * * *